United States Patent
Jibu et al.

(10) Patent No.: US 11,318,691 B2
(45) Date of Patent: May 3, 2022

(54) METHOD OF MANUFACTURING SCANNING LENS, MOLD AND METHOD OF MANUFACTURING MOLD

(71) Applicant: Brother Kogyo Kabushiki Kaisha, Nagoya (JP)

(72) Inventors: Yasuomi Jibu, Ichinomiya (JP); Hiroki Goto, Kiyosu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 224 days.

(21) Appl. No.: 16/576,131

(22) Filed: Sep. 19, 2019

(65) Prior Publication Data
US 2020/0094500 A1    Mar. 26, 2020

(30) Foreign Application Priority Data

Sep. 20, 2018 (JP) .............................. JP2018-176579

(51) Int. Cl.
*B29D 11/00* (2006.01)
*G02B 1/04* (2006.01)
*B29K 23/00* (2006.01)

(52) U.S. Cl.
CPC .......... *B29D 11/0048* (2013.01); *G02B 1/041* (2013.01); *B29K 2023/00* (2013.01); *B29K 2995/0039* (2013.01)

(58) Field of Classification Search
CPC ........................... B29D 11/0048; G02B 1/041
See application file for complete search history.

(56) References Cited

U.S. PATENT DOCUMENTS

2013/0230616 A1\* 9/2013 Neter ................. B29C 45/7312
 425/525
2019/0111588 A1\* 4/2019 Kitchloo .......... B29D 11/00442

FOREIGN PATENT DOCUMENTS

JP   H09-193257 A   7/1997
JP   2002-283352 A  10/2002

\* cited by examiner

*Primary Examiner* — Mathieu D Vargot
(74) *Attorney, Agent, or Firm* — Banner & Witcoff, Ltd.

(57) ABSTRACT

A mold includes: a first molding surface configured to form a lens surface of a scanning lens being elongated in a main-scanning direction; and a first coolant passage, which is disposed within the mold and through which a coolant to control the temperature of the first molding surface flows, wherein the first coolant passage includes: a first passage portion corresponding to a first lens portion which is a portion protruding most in an optical axis direction in the lens surface; and a second passage portion corresponding to a second lens portion which is a portion retreated most in the optical axis direction in the lens surface, and the second passage portion is located to be closer to the second lens portion than a virtual plane, which passes through the first passage portion and is orthogonal to the optical axis direction.

12 Claims, 7 Drawing Sheets

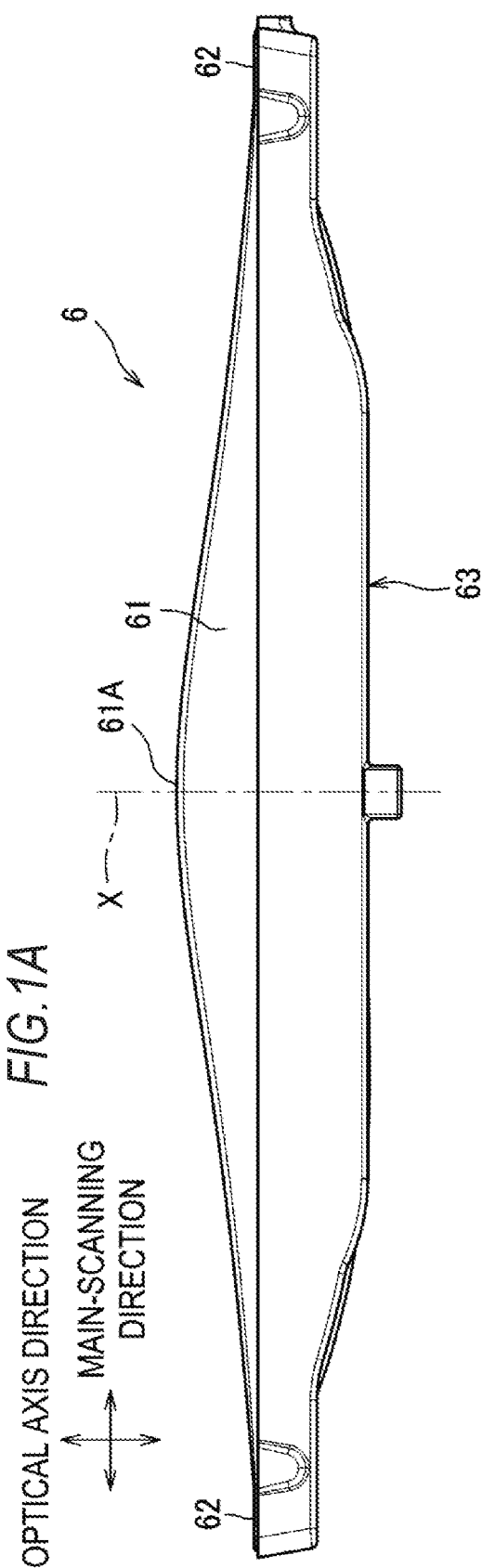
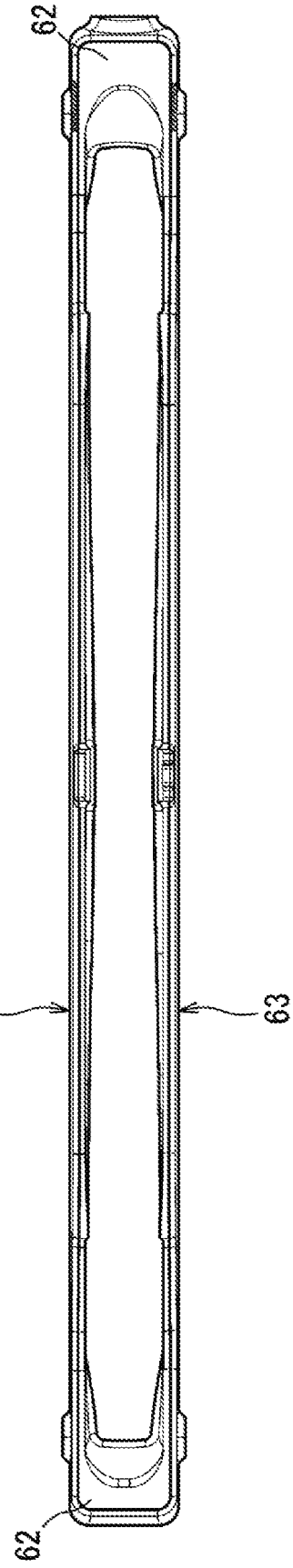

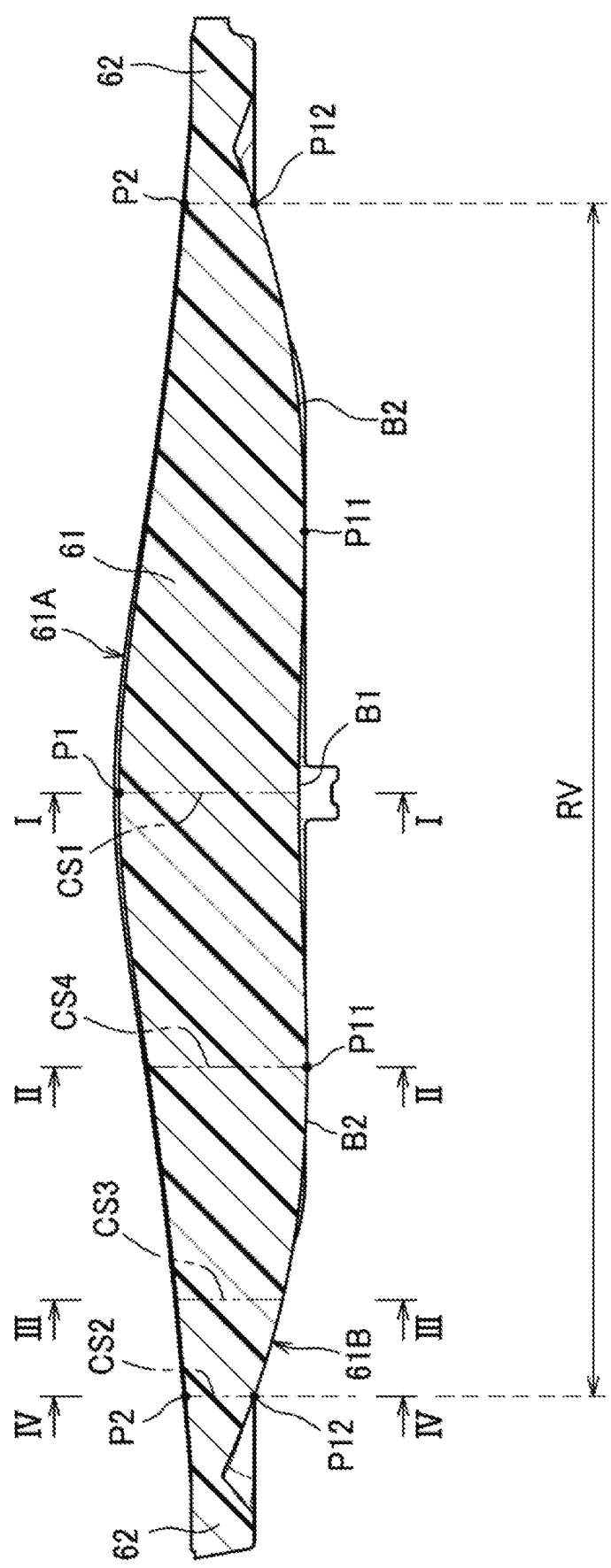

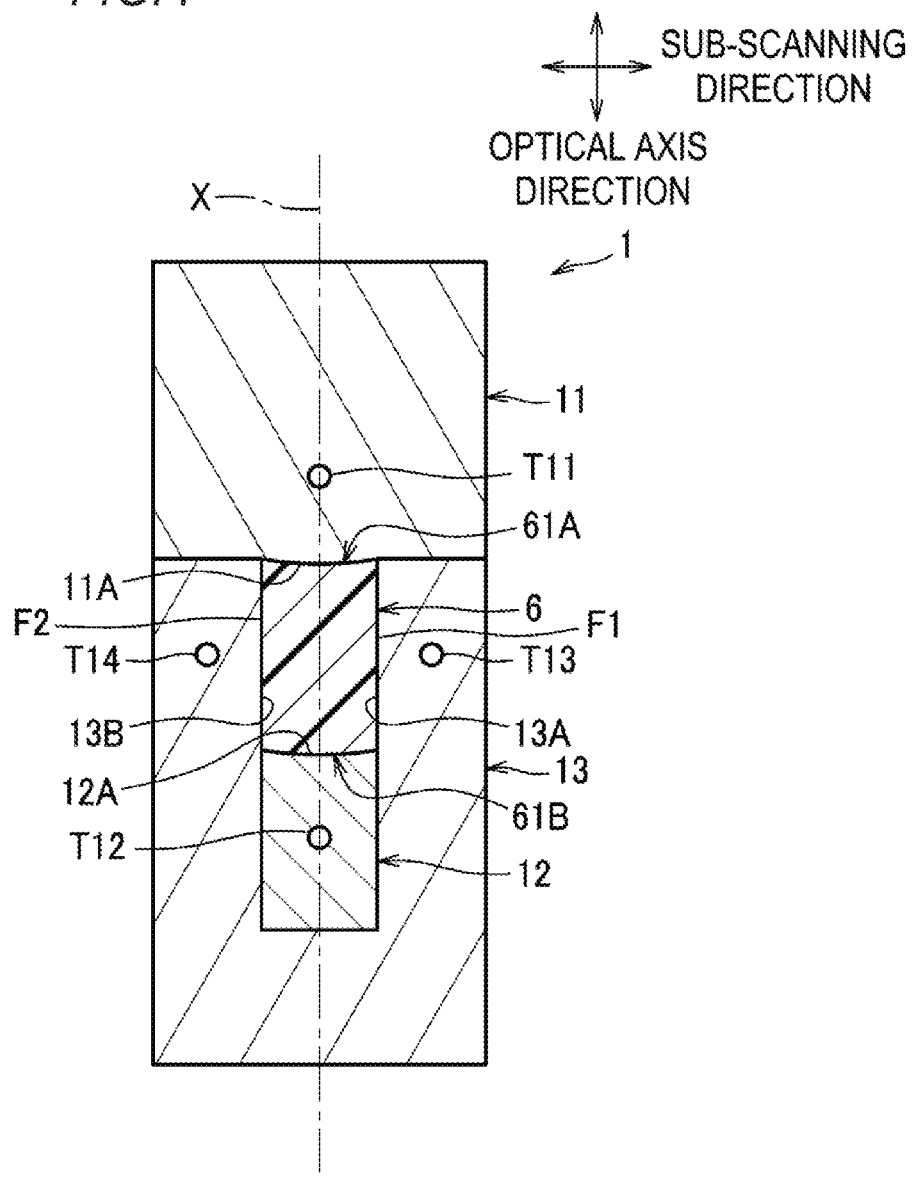

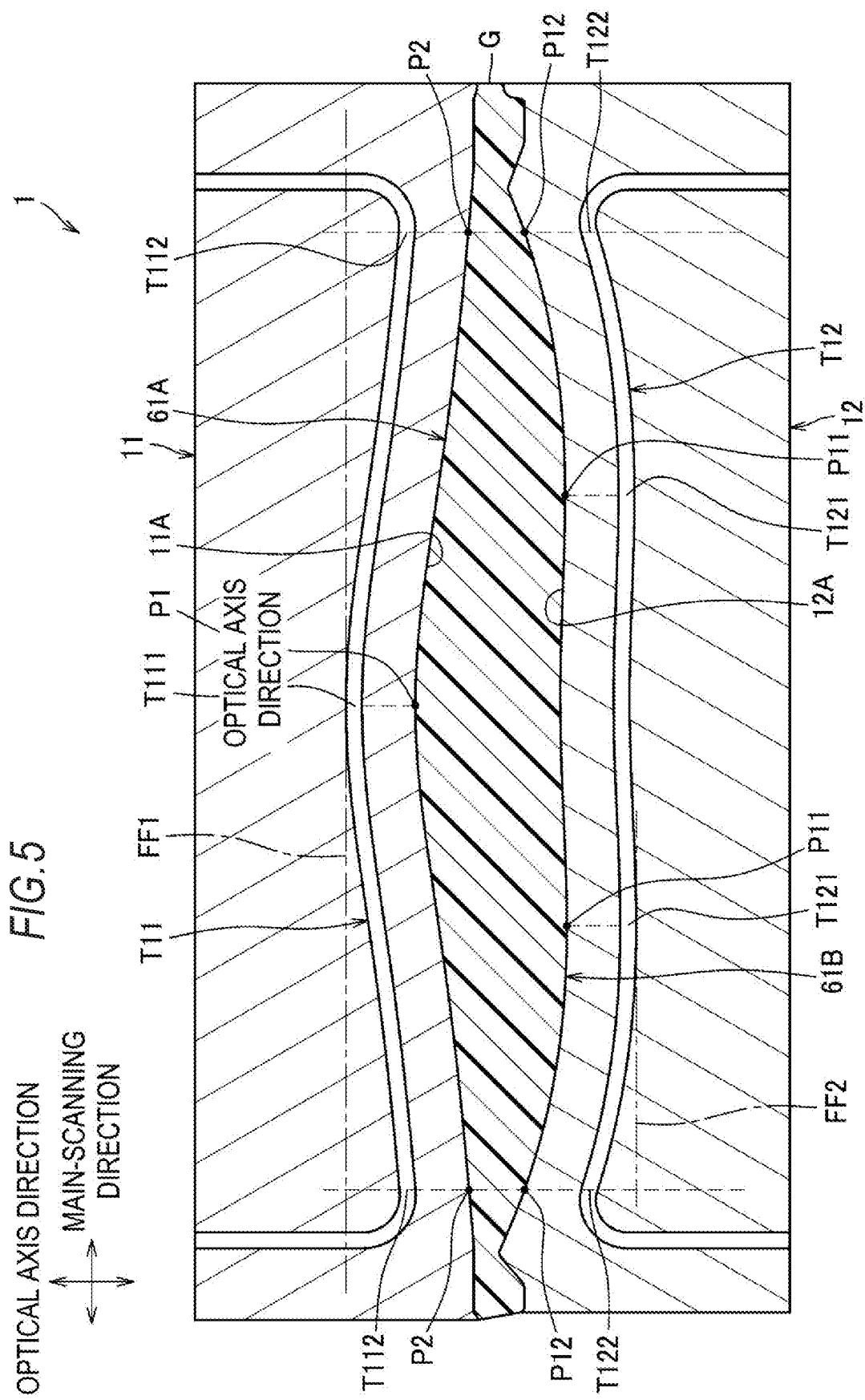

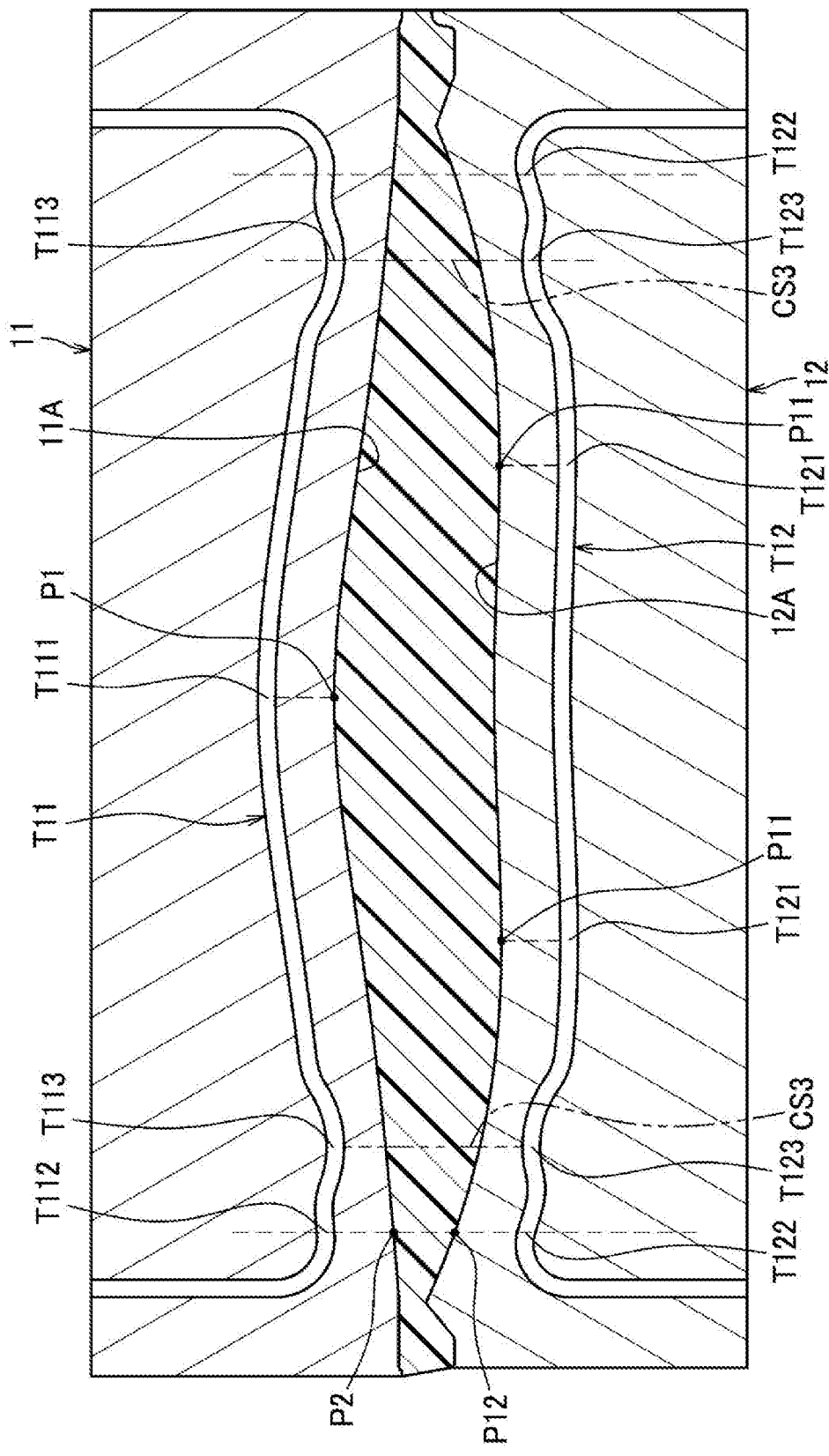

METHOD OF MANUFACTURING SCANNING LENS, MOLD AND METHOD OF MANUFACTURING MOLD

CROSS-REFERENCE TO RELATED APPLICATION

This application claims priority from Japanese Patent Application No. 2018-176579 filed on Sep. 20, 2018, the entire subject matter of which is incorporated herein by reference.

TECHNICAL FIELD

This disclosure relates to a method of manufacturing a scanning lens, a mold therefor, and a method of manufacturing a mold.

BACKGROUND ART

Generally, there is a mold for manufacturing a scanning lens and the mold has a cartridge heater for controlling the temperature of the mold is provided within a mold having a molding surface for forming a lens surface of a scanning lens.

SUMMARY

A scanning lens is elongated in a main-scanning direction, and the thickness of the scanning lens in an optical axis direction varies depending on the position thereof in the main-scanning direction. For this reason, when a cartridge heater is formed linearly along the main-scanning direction, a distance between the cartridge heater and a lens surface is greatly different at each position in the main-scanning direction, and thus there is a concern that it is not possible to appropriately control the temperature of the surface of a mold corresponding to the lens surface at each position in the main-scanning direction. Meanwhile, in order to control the temperature of the scanning lens, it is conceivable that a coolant passage through which a coolant for controlling the temperature of the surface of the mold corresponding to the lens surface passes is disposed instead of the cartridge heater. However, even in this case, when the coolant passage is formed linearly along the main-scanning direction, the above-described problem occurs.

This disclosure is to appropriately control the temperature of a mold for molding a lens surface which is elongated in a main-scanning direction at each position in the main-scanning direction.

According to one aspect of this disclosure, a method of manufacturing a scanning lens by using a mold that comprises: a first molding surface, which is configured to form a lens surface of a scanning lens being elongated in a main-scanning direction; and a first coolant passage, which is disposed within the mold and through which a coolant to control the temperature of the first molding surface flows, the method comprising: injecting a resin into the mold. The first coolant passage includes: a first passage portion corresponding to a first lens portion which is a portion protruding most in an optical axis direction in the lens surface; and a second passage portion corresponding to a second lens portion which is a portion retreated most in the optical axis direction in the lens surface, and the second passage portion is located to be closer to the second lens portion than a virtual plane, which passes through the first passage portion and is orthogonal to the optical axis direction.

According to this configuration, since the first coolant passage has a shape along the lens surface rather than the virtual plane orthogonal to the optical axis direction, the temperature of the first molding surface corresponding to the lens surface can be appropriately controlled at each position in the main-scanning direction, for example, as compared to a case where the coolant passage is formed linearly along the virtual plane.

According to another aspect of this disclosure, a mold includes: a first molding surface configured to form a lens surface of a scanning lens being elongated in a main-scanning direction; and a first coolant passage, which is disposed within the mold and through which a coolant to control the temperature of the first molding surface flows, wherein the first coolant passage includes: a first passage portion corresponding to a first lens portion which is a portion protruding most in an optical axis direction in the lens surface; and a second passage portion corresponding to a second lens portion which is a portion retreated most in the optical axis direction in the lens surface, and the second passage portion is located to be closer to the second lens portion than a virtual plane, which passes through the first passage portion and is orthogonal to the optical axis direction.

According to this mold, since the first coolant passage has a shape along the lens surface rather than the virtual plane orthogonal to the optical axis direction, the temperature of the first molding surface corresponding to the lens surface can be appropriately controlled at each position in the main-scanning direction, for example, as compared to a case where the coolant passage is formed linearly along the virtual plane.

According to another aspect of this disclosure, a method of manufacturing a mold that includes: a first molding surface, which is configured to form a lens surface of a scanning lens being elongated in a main-scanning direction; and a first coolant passage, through which a coolant to control the temperature of the first molding surface passes, the method includes: preparing a first part having a first surface and a second part having a second surface; forming a first groove having a shape corresponding to one side of an inner surface of the first coolant passage, on the first surface of the first part; forming a second groove having a shape corresponding to the other side of the inner surface of the first coolant passage, on the second surface of the second part; combining the first surface and the second surface with each other to constitute the first coolant passage and then bonding the first part and the second part to each other; and forming the first molding surface to straddle a bonding portion between the first part and the second part.

Accordingly, it is possible to easily manufacture the mold including the first coolant passage capable of evenly cooling the lens surface. In detail, even when the first coolant passage has a complex shape, it is possible to easily manufacture the mold including the first coolant passage.

According to this disclosure, it is possible to appropriately control the temperature of a first molding surface corresponding to a lens surface at each position in a main-scanning direction, as compared to a coolant passage linear along the main-scanning direction.

BRIEF DESCRIPTION OF DRAWINGS

FIG. 1A is a diagram as a scanning lens is seen from a sub-scanning direction, and FIG. 1B is a diagram as the scanning lens is seen from the front;

FIG. 2 is a cross-sectional view of the scanning lens in a cross-sectional direction orthogonal to the sub-scanning direction;

FIG. 4 is a cross-sectional view of a mold in a cross-sectional direction orthogonal to a main-scanning direction;

FIG. 5 is a cross-sectional view of the mold in a cross-sectional direction orthogonal to the sub-scanning direction;

FIG. 7 is a cross-sectional view illustrating a modification example of a first coolant passage.

DESCRIPTION OF EMBODIMENTS

Figure 3A:
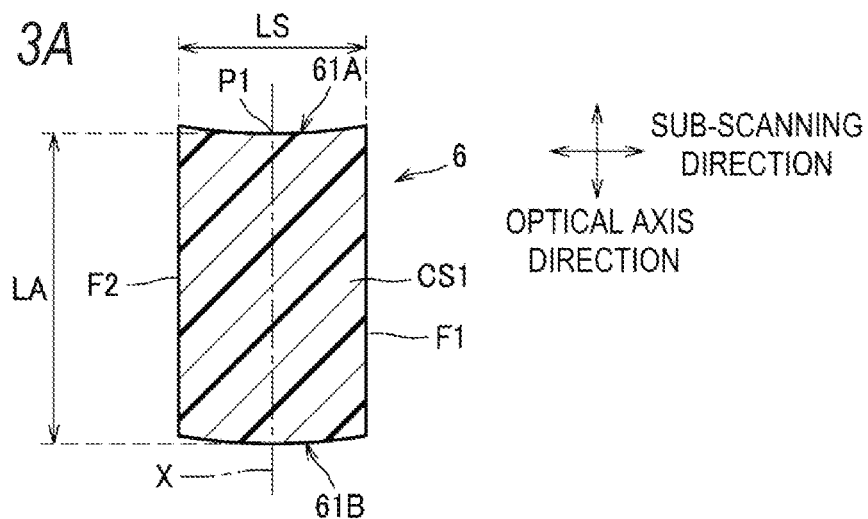
FIG. 3A is a cross-sectional view taken along line I-I of FIG. 2.

Next, an embodiment of this disclosure will be described in detail with reference to the accompanying drawings as appropriate.

As illustrated in FIG. 1, a scanning lens 6 is a scanning lens formed of a resin constituted by amorphous polyolefin. The scanning lens 6 can be used for, for example, a scanning exposure device of an image forming device, and can be used as, for example, a scanning lens on which light deflected and scanned by a polygon mirror is incident.

The scanning lens 6 mainly includes a lens portion 61 which is formed longitudinally in a main-scanning direction which is a scanning direction of a light beam, a pair of flange portions 62 which are provided at both ends of the lens portion 61 in the main-scanning direction, and a pair of rib portions 63 which are provided on both sides of the lens portion 61 and flange portions 62 in a sub-scanning direction so as to extend in the main-scanning direction. The sub-scanning direction is a direction orthogonal to the main-scanning direction and an optical axis direction.

As illustrated in FIG. 2, the lens portion 61 is formed such that the thickness thereof in the optical axis direction becomes larger at the central portion in the main-scanning direction and both ends thereof in the main-scanning direction are tapered toward the ends in the main-scanning direction. The lens portion 61 includes a first lens surface 61A and a second lens surface 61B.

The first lens surface 61A is a surface having a function of a lens and is a portion within a valid range RV of the lens which is used for scanning with a light beam on one surface of the scanning lens 6 in the optical axis direction. The first lens surface 61A is formed to have substantially a circular arc shape when seen in a cross-sectional view such that the central portion thereof in the main-scanning direction protrudes in the optical axis direction when seen in the sub-scanning direction. The first lens surface 61A includes a first lens portion P1 and two second lens portions P2. The first lens portion P1 is the center of the valid range RV and is a portion protruding most in the optical axis direction in the first lens surface 61A.

The second lens portion P2 is a portion which is retreated most in the optical axis direction in the first lens surface 61A. In other words, the second lens portion P2 is a portion which is separated most from the first lens portion P1 in the optical axis direction in the first lens surface 61A. The second lens portions P2 are respectively disposed at one end and the other end of the first lens surface 61A in the main-scanning direction.

The second lens surface 61B is a surface having a function of a lens and is a portion within the valid range RV of the lens on the other surface of the scanning lens 6 in the optical axis direction. The second lens surface 61B is constituted by a concave portion B1 in which the central portion thereof in the main-scanning direction is recessed in the optical axis direction and a pair of convex portions B2 in which parts on both sides of the concave portion B1 in the main-scanning direction protrude in the optical axis direction, when seen in the sub-scanning direction.

The second lens surface 61B has two first lens portions P11 and two second lens portions P12. The first lens portion P11 is a portion protruding most in the optical axis direction on the second lens surface 61B. The two first lens portions P11 are respectively disposed at the apexes of the pair of convex portions B2. Meanwhile, the center of the concave portion B1 is the center of the valid range RV, and the two first lens portions P11 are disposed symmetrically with respect to the center of the concave portion B1.

The second lens portion P12 is a portion which is retreated most in the optical axis direction on the second lens surface 61B. In other words, the second lens portion P12 is a portion which is separated most from the first lens portion P11 in the optical axis direction on the second lens surface 61B. The second lens portions P12 are respectively disposed at one end and the other end of the second lens surface 61B in the main-scanning direction.

As illustrated in FIGS. 3A to 3D, the scanning lens 6 has side blocks F1 and F2 which are respectively connected to the first lens surface 61A and the second lens surface 61B at both ends thereof in the sub-scanning direction. The first lens surface 61A is formed such that the cross-sectional shape thereof in a cross-sectional direction orthogonal to the main-scanning direction has substantially a circular arc shape when seen in a cross-sectional view in which the central portion thereof in the sub-scanning direction is recessed in the optical axis direction. Meanwhile, in FIG. 3, for the convenience of description, the cross-sectional shape is briefly illustrated.

Figure 3B:
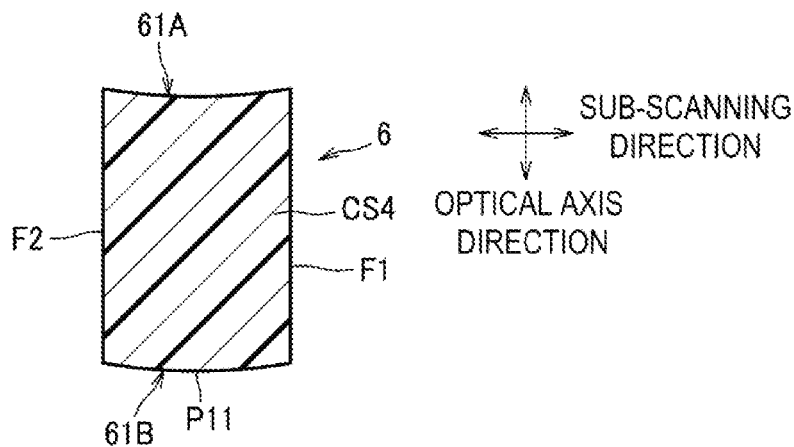
FIG. 3B is a cross-sectional view taken along line II-II of FIG. 2.

As illustrated in FIG. 3A, a first cross-section CS1 which is a portion having the first lens portion P1 of the first lens surface 61A in the scanning lens 6 is configured such that a dimension LA in the optical axis direction is larger than a dimension LS in the sub-scanning direction. As illustrated in FIG. 3D, a second cross-section CS2 which is a portion having the second lens portion P2 of the first lens surface 61A in the scanning lens 6 is configured such that the dimension LA in the optical axis direction is smaller than the dimension LS in the sub-scanning direction. Here, the dimension LA in the optical axis direction is a distance between the first lens surface 61A and the second lens surface 61B in a central portion in the sub-scanning direction of a cross-sectional direction orthogonal to the main-scanning direction of the scanning lens 6.

Figure 3C:
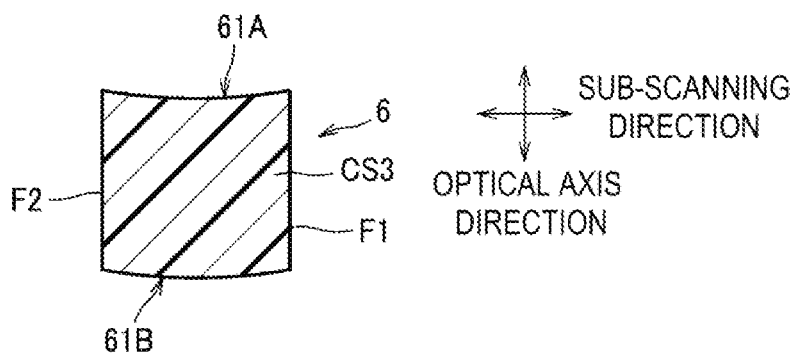
FIG. 3C is a cross-sectional view taken along line III-III of FIG. 2.
Figure 3D:
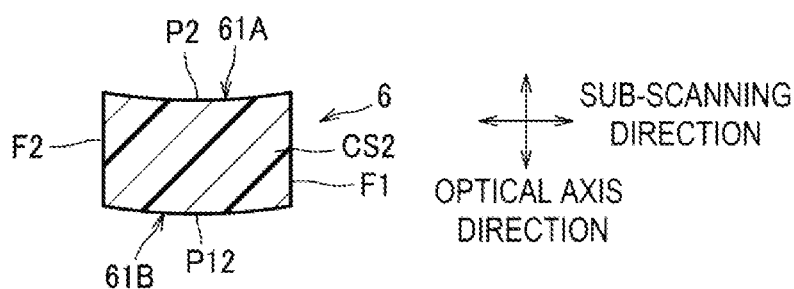
FIG. 3D is a cross-sectional view taken along line IV-IV of FIG. 2.

A third cross-section CS3 illustrated in FIG. 3C is a portion in which a ratio of the dimension LA in the optical axis direction to the dimension LS in the sub-scanning direction is 1 in the scanning lens 6. Meanwhile, in the following description, a ratio LA/LS of the dimension LA in the optical axis direction to the dimension LS in the sub-scanning direction is also referred to as an aspect ratio.

As illustrated in FIG. 2, the third cross-section CS3 is positioned between the first cross-section CS1 and the second cross-section CS2 in the main-scanning direction. A distance from the third cross-section CS3 to the second cross-section CS2 is shorter than a distance from the third cross-section CS3 to the first cross-section CS1.

As illustrated in FIGS. 3A to 3D, the second lens surface 61B is formed such that the cross-sectional shape thereof in a cross-sectional direction orthogonal to the main-scanning direction has substantially a circular arc shape when seen in a cross-sectional view in which the central portion thereof in the sub-scanning direction protrudes in the optical axis direction.

As illustrated in FIG. 3B, a fourth cross-section CS4 which is a portion having the first lens portion P11 of the second lens surface 61B in the scanning lens 6 is configured such that the dimension LA in the optical axis direction is larger than the dimension LS in the sub-scanning direction. As illustrated in FIG. 3D, the second cross-section CS2 which is a portion having the second lens portion P12 of the second lens surface 61B in the scanning lens 6 is configured such that the dimension LA in the optical axis direction is smaller than the dimension LS in the sub-scanning direction.

As illustrated in FIG. 2, the third cross-section CS3 having an aspect ratio of 1 is positioned between the fourth cross-section CS4 and the second cross-section CS2 in the main-scanning direction. A distance from the third cross-section CS3 to the second cross-section CS2 is smaller than a distance from the third cross-section CS3 to the fourth cross-section CS4.

The above-described lens surfaces 61A and 61B have shapes symmetrical to each other in the sub-scanning direction. The lens surfaces 61A and 61B have shapes substantially symmetrical to each other in the main-scanning direction, and a straight line connecting the first lens portion P1 and the center of the concave portion B1 is an optical axis X.

Next, a mold 1 for manufacturing the scanning lens 6 will be described in detail with reference to FIGS. 4 to 6.

As illustrated in FIG. 4, the mold 1 includes a first block 11, a second block 12, and a side block 13. The first block 11 includes a first molding surface 11A for forming the first lens surface 61A of the scanning lens 6 and a first coolant passage T11 through which a coolant for controlling the temperature of the first molding surface 11A passes. The first coolant passage T11 is disposed within the first block 11. The first coolant passage T11 is provided at a position overlapping with the optical axis X of the scanning lens 6 in the first block 11.

The second block 12 includes a first molding surface 12A for forming the second lens surface 61B of the scanning lens 6 and a first coolant passage T12 through which a coolant for controlling the temperature of the first molding surface 12A passes. The first coolant passage T12 is disposed within the second block 12. The first coolant passage T12 is provided at a position overlapping with the optical axis X of the scanning lens 6 in the second block 12.

The side block 13 includes second molding surfaces 13A and 13B for respectively forming the side blocks F1 and F2 of the scanning lens 6 and second coolant passages T13 and T14 through which a coolant for controlling the temperature of the second molding surfaces 13A and 13B passes. The second coolant passages T13 and T14 are disposed within the side block 13.

Here, it is possible to adopt a liquid such as water, gas, or the like as a coolant flowing in the coolant passages T11 to T14.

As illustrated in FIG. 5, the first coolant passage T11 of the first block 11 includes a first passage portion T111 corresponding to the first lens portion P1 of the first lens surface 61A and a second passage portion T112 corresponding to the second lens portion P2 of the first lens surface 61A. Here, in the present specification, "a portion corresponding to a lens portion" refers to a portion which is located at the same position as the lens portion in the main-scanning direction. That is, the first lens portion P1 and the first passage portion T111 are located at the same position in the main-scanning direction, and the second lens portion P2 and the second passage portion T112 are located at the same position in the main-scanning direction. As shown in FIG. 5, the first coolant passage T11 may include one or more bends in the plane defined by the optical axis direction and the main-scanning direction.

The second passage portion T112 passes through the first passage portion T111 and is located to be closer to the second lens portion P2 than a virtual plane FF1 orthogonal to the optical axis direction. Specifically, the first coolant passage T11 has a portion having a shape along the first molding surface 11A of the first block 11.

The first coolant passage T12 of the second block 12 includes a first passage portion T121 corresponding to the first lens portion P11 of the second lens surface 61B and a second passage portion T122 corresponding to the second lens portion P12 of the second lens surface 61B. The second passage portion T122 passes through the first passage portion T121 and is located to be closer to the second lens portion P12 than a virtual plane FF2 orthogonal to the optical axis direction. Specifically, the first coolant passage T12 has a portion having a shape along the first molding surface 12A of the second block 12.

Next, a method of manufacturing the mold 1 including the first block 11 and the second block 12 will be described. Specifically, a method of manufacturing the first block 11 will be described. Meanwhile, a method of manufacturing the second block 12 is the same as the method of manufacturing the first block 11, and thus the description thereof will be omitted.

Figure 6A:
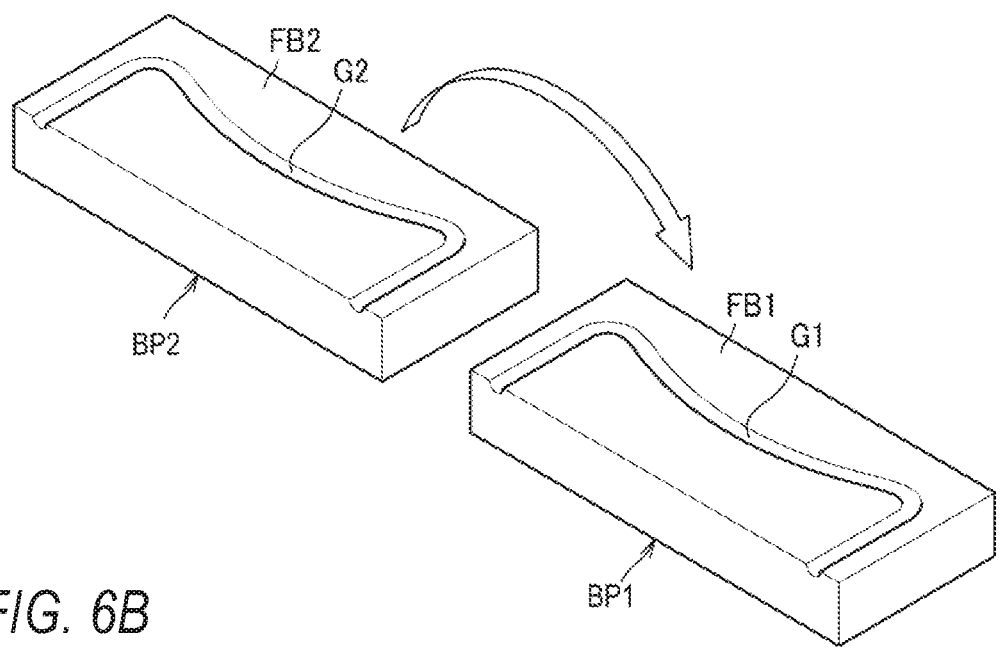
FIGS. 6A to 6E are diagrams illustrating a method of manufacturing a first block.

As illustrated in FIG. 6A, in the method of manufacturing the first block 11, first, a rectangular first part BP1 having a first surface FB1 constituted by a plane and a rectangular second part BP2 having a second surface FB2 constituted by a plane are prepared. The first part BP1 and the second part BP2 are formed of stainless steels having the same composition. A first groove G1 having a shape corresponding to one side of the inner surface of the first coolant passage T11 is formed on the first surface FB1 of the first part BP1 through processing such as cutting. Here, the first groove G1 is a groove having a semicircular shape when seen in a cross-sectional view.

Subsequently, a second groove G2 having a shape corresponding to the other side of the inner surface of the first coolant passage T11 is formed on the second surface FB2 of the second part BP2 through processing such as cutting. Here, the second groove G2 is a groove having a semicircular shape when seen in a cross-sectional view.

Figure 6B:
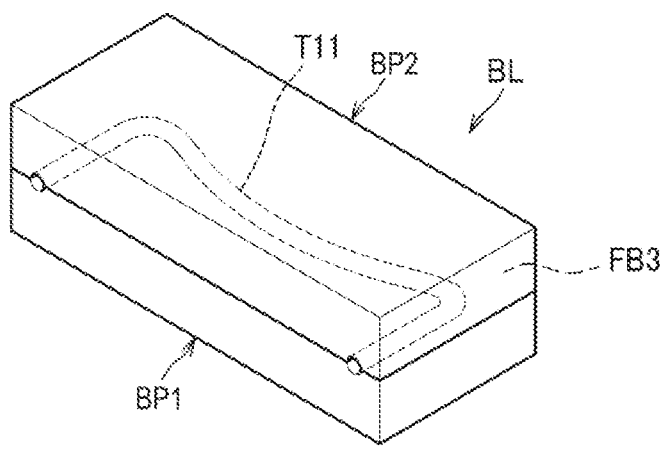

Next, as illustrated in FIG. 6B, a block BL including the first coolant passage T11 is configured by combining the first surface FB1 of the first part BP1 and the second surface FB2 of the second part BP2 with each other. In detail, the first coolant passage T11 having a circular shape when seen in a cross-sectional view is configured by combining the grooves G1 and G2 having a semicircular shape when seen in a cross-sectional view.

Thereafter, the first part BP1 and the second part BP2 are bonded to each other. Here, regarding a bonding method, the first surface FB1 of the first part BP1 and the second surface FB2 of the second part BP2 are pressurized in a combined state and diffusion-bonded to each other. As a result, the first part BP1 and the second part BP2 are integrated without joints to form the rectangular block BL.

Figure 6C:
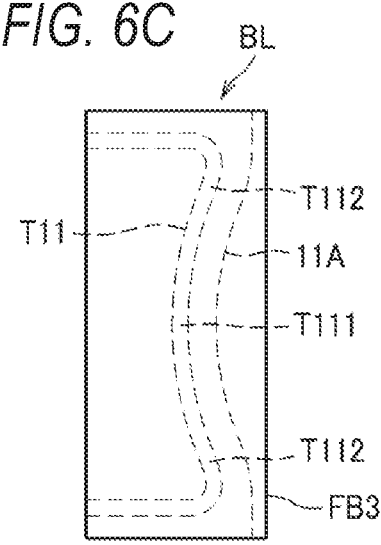
Figure 6D:
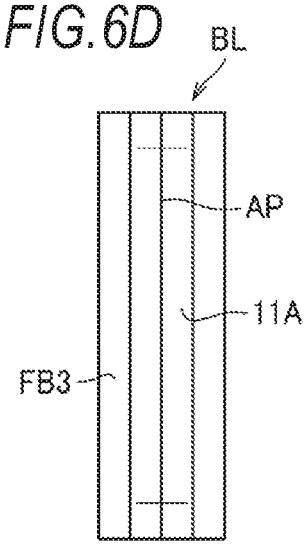

Next, as illustrated in FIGS. 6C and 6D, the first molding surface 11A is formed through processing such as cutting so as to straddle a bonding portion AP between the first part BP1 and the second part BP2. In detail, the first molding surface 11A is formed on a third surface FB3 which is closest to the above-described first passage portion T111 and second passage portion T112 of the first coolant passage T11 on the surface of the rectangular block BL. When the first molding surface 11A is formed on the third surface FB3, the position of the first molding surface 11A with respect to the bonding portion AP is determined so that the bonding portion AP overlaps with the optical axis X of the scanning lens 6 which is formed by the first molding surface 11A.

Figure 6E:
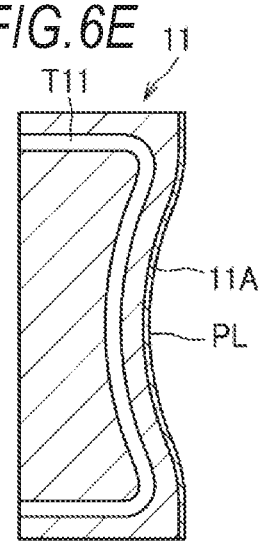

Thereafter, as illustrated in FIG. 6E, the manufacture of the first block 11 is completed by performing plating PL on the first molding surface 11A.

Next, a method of manufacturing the scanning lens 6 using the mold 1 will be described.

As illustrated in FIGS. 4 and 5, first, a resin is injected into the mold 1. In detail, a resin is injected into a cavity formed by the first block 11, the second block 12, and the side block 13 from a gate G disposed on one end side of the scanning lens 6 in the main-scanning direction.

When the resin injected into the mold 1 is solidified, a coolant having a first temperature T1 is allowed to flow in the first coolant passages T11 and T12, and a coolant having a second temperature T2 higher than the first temperature T1 is allowed to flow in the second coolant passages T13 and T14. In detail, at the time when the injection of resin into the mold 1 is started, a coolant is allowed to flow in the coolant passages T11 to T14 so as to control the temperatures of the first molding surfaces 11A and 12A and the second molding surfaces 13A and 13B. Meanwhile, the first temperature T1 and the second temperature T2 are preferably set as follows with respect to a glass transition temperature Tg of a resin material used for molding.

$$Tg-30(\text{degrees Celsius}) \geq T1 \geq Tg-50(\text{degrees Celsius})$$

$$Tg-10(\text{degrees Celsius}) \geq T2 \geq Tg-30(\text{degrees Celsius})$$

Tg: glass transition temperature

As described above, the coolant is flowed into the coolant passages T11 to T14 to control the temperature of the first block 11, the second block 12, and the side block 13 and to cool the resin injected into the cavity of the mold 1 to a state of a glass transition temperature or less. In detail, the temperature of the first block 11 and the second block 12 becomes lower than the temperature of the side block 13. As a result, the temperature of the first molding surfaces 11A and 12A becomes lower than the temperature of the second molding surfaces 13A and 13B at any position in the main-scanning direction in the valid range RV of the scanning lens 6. Regarding the resin injected into the cavity of the mold 1, the resin on the first and second lens surfaces 61A and 61B of the scanning lens 6 which are in contact with the first molding surfaces 11A and 12A is cooled to a temperature lower than the temperature on the side blocks F1 and F2 which are in contact with the second molding surfaces 13A and 13B, and thus the solidification of the resin in a direction along the optical axis X proceeds rapidly. In other words, the solidification of the resin injected into the cavity of the mold 1 in the direction along the optical axis X is accelerated in the valid range RV of the scanning lens 6. In a state where a predetermined period of time elapses thereafter and the resin is solidified to the center of the scanning lens 6, the scanning lens 6 is taken out from the mold 1 by opening the mold 1 to separate the first block 11 and the second block 12 from each other. The scanning lens 6 is manufactured through the above-described process.

According to the above description, the following effects can be obtained in the present embodiment.

Since the first coolant passages T11 and T12 have the shapes along the lens surfaces 61A and 61B, the temperatures of the first molding surfaces 11A and 12A which are in contact with the lens surfaces 61A and 61B can be appropriately controlled at each position in the main-scanning direction, for example, as compared with a case where a coolant passage is formed linearly along a virtual plane orthogonal to the optical axis direction.

Even when a scanning lens having a portion with a different aspect ratio is molded, it is possible to cool from the lens surfaces 61A and 61B in the valid range RV of the scanning lens 6 using the first coolant passages T11 and T12 along the lens surfaces 61A and 61B and to accelerate the progress of solidification in the optical axis direction.

Since the first coolant passages T11 and T12 are positioned at the centers of the lens surfaces 61A and 61B in the sub-scanning direction by disposing the first coolant passages T11 and T12 at a position overlapping with the optical axis X of the scanning lens 6, it is possible to cool the lens surfaces 61A and 61B symmetrically in the sub-scanning direction from the center in the sub-scanning direction.

When the material of resin for forming the scanning lens 6 is amorphous polyolefin, double refraction may occur due to the change in a contraction direction of the lens in an area where the direction of solidification of the scanning lens 6 changes. However, according to the above-described manufacturing method, since the progress of solidification in the optical axis direction can be accelerated in the valid range RV of the scanning lens 6, an area where double refraction occurs is hardly formed, and thus the scanning lens 6 can have excellent image forming characteristics.

In the method of manufacturing the first block 11, the first coolant passage T11 is configured by respectively forming the grooves G1 and G2 on the respective surfaces FB1 and FB2 of the first part BP1 and the second part BP2 and combining the grooves G1 and G2 with each other, and thus the first coolant passage T11 having a shape along the lens surface can be formed at a position overlapping with the optical axis.

Since the plating PL is performed on the first molding surface 11A, the first molding surface 11A can have an excellent profile irregularity.

Meanwhile, this disclosure is not limited to the embodiment and can be used in various modes as exemplified below. In the following description, members having substantially the same structures as those in the embodiment are denoted by the same reference numerals and signs, and the description thereof will be omitted.

In the embodiment, the first coolant passages T11 and T12 have shapes along the first molding surfaces 11A and 12A, but this disclosure is not limited thereto. For example, the first coolant passages T11 and T12 may have shapes as illustrated in FIG. 7.

Specifically, as illustrated in FIG. 7, the first coolant passage T11 of the first block 11 has a third passage portion T113 corresponding to the third cross-section CS3 which is a portion having an aspect ratio of 1. The third passage portion T113 is located to be closer to the first molding surface 11A in the optical axis direction than the first passage portion T111 and the second passage portion T112.

Similarly, the first coolant passage T12 of the second block 12 has a third passage portion T123 corresponding to the third cross-section CS3 which is a portion having an aspect ratio of 1. The third passage portion T123 is located to be closer to the first molding surface 12A in the optical axis direction than the first passage portion T121 and the second passage portion T122.

When an aspect ratio is reversed in each area in the main-scanning direction of the scanning lens 6, a direction in which the solidification proceeds in the vicinity of the portion having an aspect ratio of 1 is not dominant in either the optical axis direction or the sub-scanning direction, and thus the contraction is likely to become uneven. According to this configuration, it is possible to suppress unevenness of contraction by preferentially cooling the portion having an aspect ratio of 1 from the optical axis direction in the third passage portions T113 and T123 of the first coolant passages T11 and T12 and making the progress of solidification from the optical axis direction dominant.

The components described in the above-described embodiment and modification example may be arbitrarily combined with each other and implemented.

What is claimed is:

1. A method of manufacturing a scanning lens by using a mold that comprises: a first molding surface, which is configured to form a lens surface of a scanning lens being elongated in a main-scanning direction; and a first coolant passage, which is disposed within the mold and through which a coolant to control the temperature of the first molding surface flows, the method comprising:
    injecting a resin into the mold,
    wherein the first coolant passage includes: a first passage portion corresponding to a first lens portion which is a portion protruding most in an optical axis direction in the lens surface; and a second passage portion corresponding to a second lens portion which is a portion retreated most in the optical axis direction in the lens surface,
    wherein the second passage portion is located closer to the second lens portion than a virtual plane, which passes through the first passage portion and is orthogonal to the optical axis direction, and
    wherein the first coolant passage is bent in a second virtual plane defined by the optical axis direction and the main-scanning direction.

2. The method of manufacturing the scanning lens according to claim 1, wherein
    a portion having the first lens portion in the scanning lens is configured such that the dimension in the optical axis direction is larger than the dimension in a sub-scanning direction, and
    a portion having the second lens portion in the scanning lens is configured such that the dimension in the optical axis direction is smaller than the dimension in the sub-scanning direction.

3. The method of manufacturing the scanning lens according to claim 2, wherein
    the first coolant passage includes a third passage portion corresponding to a portion where a ratio of the dimension in the optical axis direction to the dimension in the sub-scanning direction is 1 in the scanning lens, and
    the third passage portion is located to be closer to the first molding surface than the first passage portion and the second passage portion in the optical axis direction.

4. The method of manufacturing the scanning lens according to claim 1, wherein
    the first coolant passage is provided at a position overlapping with an optical axis of the scanning lens in the mold.

5. The method of manufacturing the scanning lens according to claim 1, wherein
    the mold having second molding surfaces configured to form side blocks to be connected to the lens surface of the scanning lens and a second coolant passage which is disposed within the mold and through which a coolant for controlling the temperature of the second molding surface flows, and
    when the resin injected into the mold is solidified, a coolant having a first temperature is allowed to flow in the first coolant passage and a coolant having a second temperature higher than the first temperature is allowed to flow in the second coolant passage.

6. The method of manufacturing the scanning lens according to claim 5, wherein
    when the first temperature is set as T1, the second temperature is set as T2, and a glass transition temperature is set as Tg, the following conditions are satisfied:

$$Tg-30(\text{degrees Celsius}) T1 Tg-50(\text{degrees Celsius})$$

$$Tg-10(\text{degrees Celsius}) T2 Tg-30(\text{degrees Celsius}).$$

7. The method of manufacturing the scanning lens according to claim 1, wherein
    the resin is amorphous polyolefin.

8. A mold comprising:
    a first molding surface configured to form a lens surface of a scanning lens being elongated in a main-scanning direction; and
    a first coolant passage, which is disposed within the mold and through which a coolant to control the temperature of the first molding surface flows,
    wherein the first coolant passage includes:
        a first passage portion corresponding to a first lens portion which is a portion protruding most in an optical axis direction in the lens surface; and
        a second passage portion corresponding to a second lens portion which is a portion retreated most in the optical axis direction in the lens surface,
    wherein the second passage portion is located to be closer to the second lens portion than a virtual plane, which passes through the first passage portion and is orthogonal to the optical axis direction, and
    wherein the first coolant passage is bent in a second virtual plane defined by the optical axis direction and the main-scanning direction.

9. A method of manufacturing a mold that comprises: a first molding surface, which is configured to form a lens surface of a scanning lens being elongated in a main-scanning direction, the scanning lens including an optical axis; and a first coolant passage, through which a coolant to control the temperature of the first molding surface flows, the method comprising:
    preparing a first part having a first surface and a second part having a second surface;
    forming a first groove having a shape corresponding to one side of an inner surface of the first coolant passage, on the first surface of the first part;
    forming a second groove having a shape corresponding to the other side of the inner surface of the first coolant passage, on the second surface of the second part;
    combining the first surface and the second surface with each other to constitute the first coolant passage such that the first coolant passage is bent in a second virtual plane defined by the optical axis and the main-scanning direction, and then bonding the first part and the second part to each other; and forming the first molding surface to straddle a bonding portion between the first part and the second part.

10. The method of manufacturing the mold according to claim 9, wherein the bonding portion overlaps with an optical axis of the scanning lens.

11. The method of manufacturing the mold according to claim 9, wherein plating is performed on the first molding surface.

12. The method of manufacturing the mold according to claim 9, wherein bonding the first part and the second part to each other includes:

pressurizing the first surface and the second surface in a combined state and diffusion-bonding the first surface and the second surface to each other.

* * * * *

UNITED STATES PATENT AND TRADEMARK OFFICE
CERTIFICATE OF CORRECTION

PATENT NO. : 11,318,691 B2
APPLICATION NO. : 16/576131
DATED : May 3, 2022
INVENTOR(S) : Yasuomi Jibu et al.

It is certified that error appears in the above-identified patent and that said Letters Patent is hereby corrected as shown below:

In the Claims

Column 10, Claim 6, Line 22:
Please delete "Tg - 30 (degrees Celsius)T1Tg - 50 (degrees Celsius)" and insert
--Tg - 30 (degrees Celsius) $\geq$ T1 $\geq$ Tg - 50 (degrees Celsius)--

Column 10, Claim 6, Line 24:
Please delete "Tg - 10 (degrees Celsius)T2Tg - 30 (degrees Celsius)" and insert
--Tg - 10 (degrees Celsius) $\geq$ T2 $\geq$ Tg - 30 (degrees Celsius)--

Column 10, Claim 8, Line 43:
Please delete "located to be closer" and insert --located closer--

Signed and Sealed this
Twenty-fourth Day of January, 2023

Katherine Kelly Vidal
*Director of the United States Patent and Trademark Office*